United States Patent [19]
Tan

[11] Patent Number: 5,172,422
[45] Date of Patent: Dec. 15, 1992

[54] FAST CHARACTER SEGMENTATION OF SKEWED TEXT LINES FOR OPTICAL CHARACTER RECOGNITION

[75] Inventor: Hin-Leong Tan, Rochester, N.Y.

[73] Assignee: Eastman Kodak Company, Rochester, N.Y.

[21] Appl. No.: 699,029

[22] Filed: May 13, 1991

[51] Int. Cl.$^5$ .............................................. G06K 9/36
[52] U.S. Cl. ........................................ 382/9; 382/48; 358/488
[58] Field of Search .................. 382/9, 45, 48, 18, 46; 358/488; 271/265

[56] References Cited

U.S. PATENT DOCUMENTS

| | | | |
|---|---|---|---|
| 3,553,437 | 1/1971 | Boothroyd | 235/61.11 |
| 4,558,461 | 12/1985 | Schlang | 382/9 |
| 4,562,594 | 12/1985 | Bednar et al. | 382/9 |
| 4,776,024 | 10/1988 | Katoh et al. | 382/9 |
| 4,845,768 | 7/1989 | Kochert et al. | 382/46 |
| 4,866,784 | 9/1989 | Barski | 382/46 |
| 4,926,490 | 5/1990 | Mano | 382/9 |
| 4,944,505 | 7/1990 | Sherman, III | 271/265 |
| 4,953,230 | 8/1990 | Kurose | 382/9 |

FOREIGN PATENT DOCUMENTS 56-204636 6/1983 Japan .

OTHER PUBLICATIONS

J. Kim "Baseline Driff Correction of Handwritten Text," *IBM Technical Disclosure Bulletin*, vol. 25, No. 10 pp. 5111-5114 (1983).

*Primary Examiner*—Joseph Mancuso
*Assistant Examiner*—Yon Jung
*Attorney, Agent, or Firm*—Edward Dugas

[57] ABSTRACT

A character segmentation process for skewed documents divides the document bit map into vertical blocks and within each vertical block estimates initial top and bottom bounds of each character in a character row from horizontal projections of the vertical block, thereby avoiding the effects of skew. Operations in the document bit map to compute the exact top, bottom, left and right boundaries of the character are confined within the narrow strip between the initial top and bottom bounds of the character so as to greatly reduce the amount of data fetched from memory during such operations and thereby speed up the segmentation process.

12 Claims, 7 Drawing Sheets

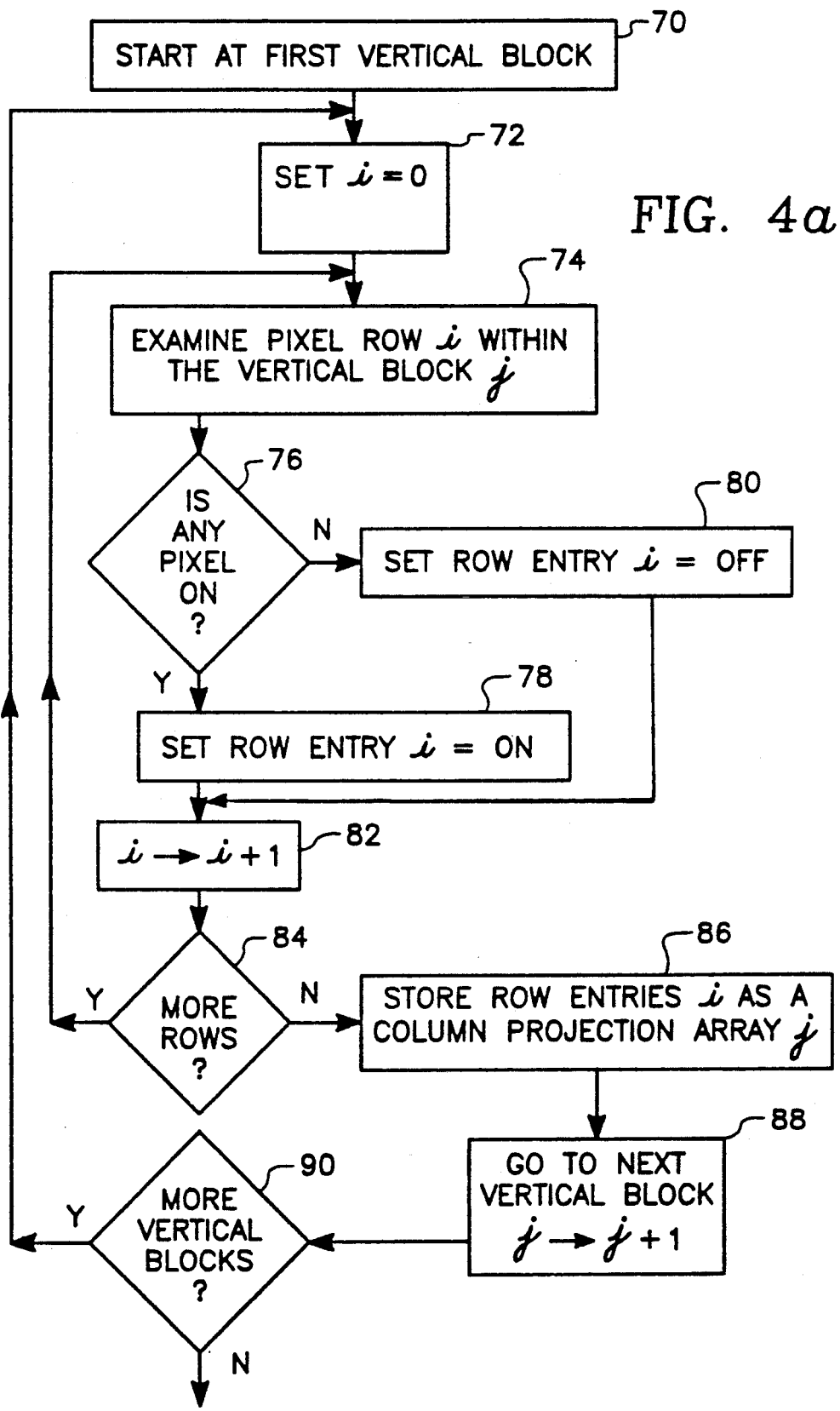

FAST CHARACTER SEGMENTATION OF SKEWED TEXT LINES FOR OPTICAL CHARACTER RECOGNITION

BACKGROUND OF THE INVENTION

1. Technical Field

The invention is related to apparatus and processes for segmenting characters in a bit map image of a scanned document in an optical character recognition preprocessor.

2. Background Art

Character segmentation is a fundamental and necessary processing stage of any optical character recognition (OCR) system. This task is simple if the text lines are aligned horizontally along the rows of pixels in the image and separated by white spaces between the lines. In this case it is straightforward to segment the individual characters in the text line by first finding the vertical bounds of the box enclosing the line and then segmenting each character by scanning for white spaces within the boxed line. However, if the lines of text are skewed, the task becomes difficult because the horizontal white spaces do not exist and it may not be possible to draw a single bounding box for the text line. Consequently, one has to resort to more sophisticated techniques for segmenting the character components. In the prior art, such techniques require either computing the skew angle of the document and then deskewing the document image, or performing complex operations on the bit-map image of the document. In either case, the character segmenting operation is complex and time consuming, mainly because it requires accessing large amounts of data from the bit map image of the document, a significant disadvantage.

One example of character segmentation in which the skew angle of the document is computed is U.S. Pat. No. 4,558,461 to Schlang. The estimated skew angle is used to set a statistical bound on the text lines. The actual text data is then rotated to obtain an unskewed version of the text line. Such a technique does not segment individual character components and requires extensive computations and operations in the bit map image for skew detection and de-rotation of text lines. One disadvantage of having to perform extensive operations in the bit map image data is that such operations are time-consuming, due to the large amount of bit map image data that must be located and fetched from memory.

Other examples of the foregoing type of technique in which the document skew must be computed or estimated are U.S. Pat. No. 4,926,490 to Mano, U.S. Pat. No. 4,866,784 to Barski and a publication by Kim, "Baseline Drift Correction of Handwritten Text," *IBM Technical Disclosure Bulletin,* Volume 25, No. 10. pp. 5111–5114.

One example of character segmentation requiring extensive arithmetic operations on the bit-map image of the skewed document is U.S. Pat. No. 4,776,024 to Katoh et al. In this example, the bits are combined together column-by-column as well as row-by-row in successive OR operations to determine a sum and a frequency of "on" bits in each column and in each row. Such operations are time-consuming because of the large amounts of data which must be fetched from the bit-map image and because of the large number of arithmetic operations that must be performed.

Before characters can be segmented individually, each of the character rows must first be segmented from one another. This is typically accomplished by inspecting the horizontal projection of the bit map image of the document for empty spaces between rows. The problem with documents that are severely skewed is that adjacent character rows may overlap in the horizontal projection of the document bit map image. One technique for overcoming this problem is to divide the document into plural vertical blocks and segment the character lines in each of the vertical blocks. This latter technique is disclosed in U.S. Pat. No. 4,776,024 to Katoh et al. (referred to hereinabove) and in Japanese Patent Application No. 56-204636 by M. Maeda published June 25, 1983. The Japanese Patent Application by Maeda discloses a method for segmenting character rows from one another using this technique. Maeda teaches that a complete character row within one vertical block is joined together with the corresponding character row in the adjacent or next vertical block by looking for a character row in the next block which vertically overlaps the character row in the one vertical block. Once the entire character row has been segmented across all vertical blocks, its location or boundary map is then output to a character segmentation process.

The disadvantage of the technique disclosed in the Japanese Patent Application by Maeda is that the character segmentation process must begin anew with a bit map image of the complete character row and perform all of the steps necessary to segment individual characters. No use is made of the information produced during the horizontal projection of character rows within individual vertical blocks of document image. Thus, the problem remains that the segmentation of individual characters requires large amounts of data from a bit map image and time-consuming operations to be performed on such data.

DISCLOSURE OF THE INVENTION

The present invention provides a way of segmenting individual characters as an integral part of the row segmentation process without performing operations on the document bit map image, except in the final steps of the process. In the final steps of the process, the portions of the document bit map image which must be accessed are restricted to exceedingly small sections, minimizing the amount of data processed and maximizing speed. Elimination of the typical bit map image operations for most of the steps of the process and minimization of the amount of bit map data fetched during each of the final steps reduces the amount of data and time required to perform character segmentation. This increases the speed of the overall character segmentation process, a significant advantage.

As in the Japanese Patent Application to Maeda referred to above, the document image is divided into plural vertical blocks. Within each vertical block, the horizontal projection of the vertical block is used to find the top and bottom boundaries of each horizontal (or skewed) character row. In a preferred embodiment, these top and bottom boundaries are expanded to overlap those of the corresponding character row in the adjacent vertical blocks to the left and right. They are also expanded to encompass any isolated character components such as the dot over a small letter "i". Within the small section of the document bit map image between these top and bottom boundaries, the process searches for the left boundary of the first character to the right by looking for the first pixel column to the right containing at least a first threshold number (e.g., one) of "ON" pixels. Then, within the same small section, the process searches for the right boundary of the character by looking for the first pixel column to the right of the left boundary containing no more than a second threshold number (e.g., zero) of "ON" pixels. The next step is to find the top boundary of the character itself by searching the small section of the document bit map image between the left and right character boundaries for the first pixel row below the top row boundary containing at least the first threshold number of "ON" pixels (e.g., at least one "ON" pixel). The last step is to find the bottom boundary of the character by searching the same small section between the left and right boundaries for the first pixel row above the bottom character row boundary containing at least the first threshold number of "ON" pixels (e.g., at least one "ON" pixel). This completes the character segmentation process for one character. The process continues by repeating the step of looking for the left character boundary of the next character, starting to the right of the right boundary of the current character.

The character rows of adjacent vertical blocks are concatenated by searching for a vertical overlapping of character rows of adjacent vertical blocks. In the preferred embodiment of the invention, the concatenation is performed by searching for the character row in the next vertical block whose top and bottom boundaries span the center of the last character of the current vertical block.

In the initial step of locating the top and bottom boundaries of each character row in a vertical block by horizontal projection, the invention generates top and bottom projection arrays for each vertical block. The top projection array comprises for each horizontal pixel row one of: (a) the top pixel row number of the character row in which that pixel row resides or (b) minus one if the pixel row is not within any character row. The bottom projection array comprises for each horizontal pixel row one of: (a) the bottom pixel row number of the character row in which that pixel row resides or (b) minus one if the pixel row is not within any character row. These projection arrays provide the necessary information for defining the searching steps in the remainder of the process.

The foregoing character segmentation process holds to an absolute minimum the amount of bit map image data that must be fetched during each step of finding the boundaries of an individual character. The sparing use of bit map image data significantly speeds up the character segmentation process.

BRIEF DESCRIPTION OF THE DRAWINGS

The invention is described in detail with reference to the accompanying drawings, of which:

FIGS. 4a and 4b are block flow diagrams illustrating the steps within the process of FIG. 3 for generating the top and bottom projection arrays of FIG. 2;

MODES FOR CARRYING OUT THE INVENTION

In describing the invention, reference will be made to "character rows", "pixel rows" and "pixel columns". The term "pixel rows" as used herein refers to horizontal rows of binary pixel elements of the bit map image of the document, while the term "pixel columns" refers to vertical columns of binary pixel elements of the bit map image. "Character row" or "segment" refers to a horizontal or skewed row of characters in the document.

Figure 1:
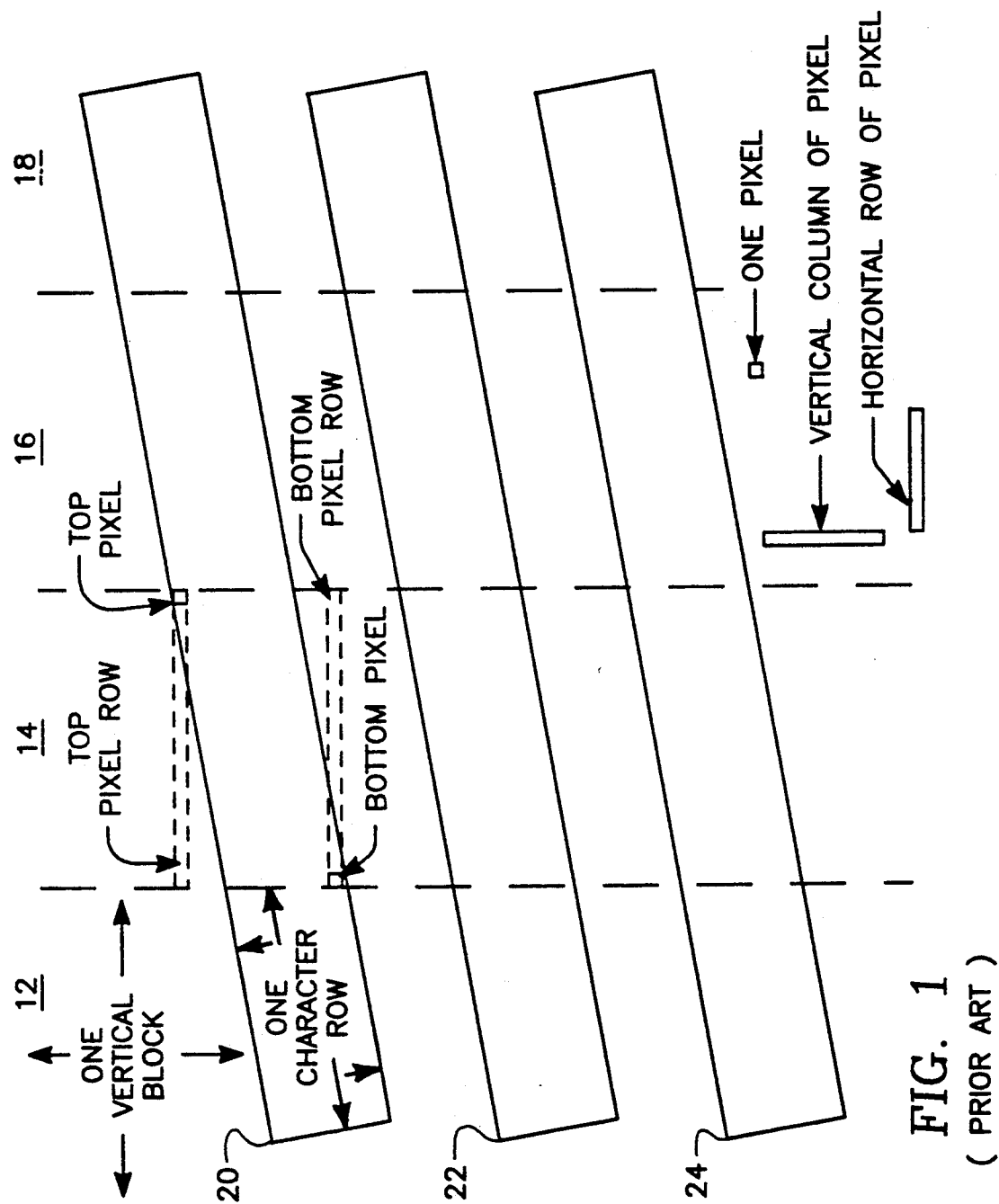
FIG. 1 is a diagram illustrating how the document image is divided into vertical blocks in accordance with the prior art.

Referring to FIG. 1, in accordance with the technique of the above-referenced Japanese Patent Application by Maeda, the bit map image of a skewed document is divided into plural column sub-images or vertical blocks 12, 14, 16, 18 so that the individual character rows or segments 20, 22, 24 do not overlap one another in a horizontal projection of each vertical block 12, 14, 16, 18.

Figure 2:
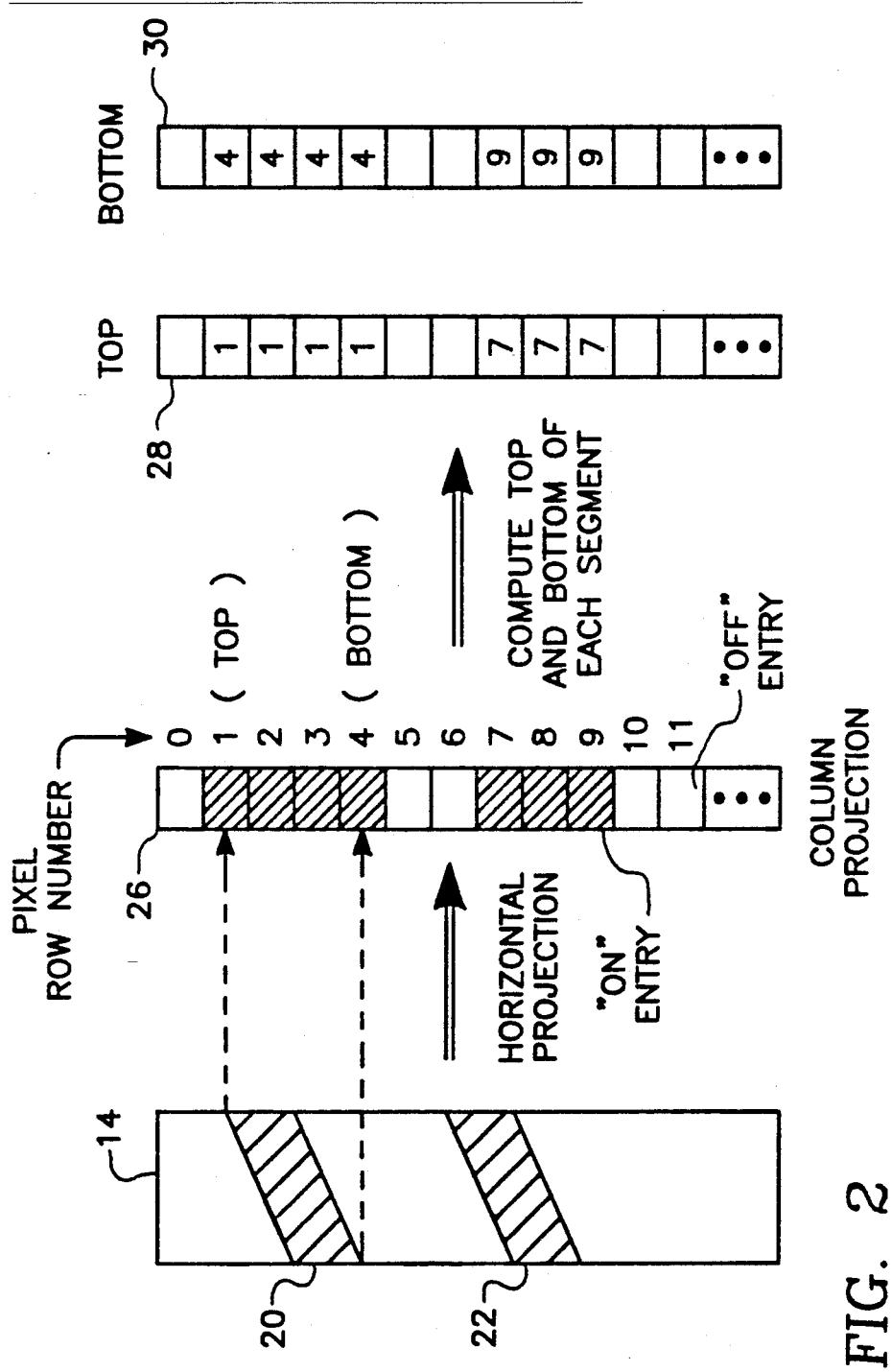
FIG. 2 is a diagram illustrating the construction of the top and bottom projection arrays and their relationship with the image of the corresponding vertical block.

Referring to FIG. 2, a horizontal or column projection 26 is taken of an individual vertical block (for example, the vertical block 14). In the column projection 26 of FIG. 2, those pixel rows containing "ON" pixels correspond to cross-hatched elements of the projection 26 while those pixels rows containing no "ON" pixels correspond to empty elements in the projection 26. The top projection or segment array 28 is computed from the projection 26 by noting for each pixel row within a character row (e.g., 20) the top pixel row of the character row. The bottom projection or segment array 30 is computed from the projection 26 by noting for each pixel row within a character row (e.g., 20) the bottom pixel row of the character row. In the case of the character row 20, the top and bottom pixel rows in the example of FIG. 2 are pixel rows 1 and 4 respectively. Accordingly, the top projection array 28 consists of the entry "1" for pixel rows 1 through 4 while the bottom projection array 30 consists of a "4" entry for pixel rows 1 through 4 (the remaining entries each being a −1, not shown). Computation of the top and bottom projection arrays 28 and 30 will be described in detail hereinbelow.

Figure 3:
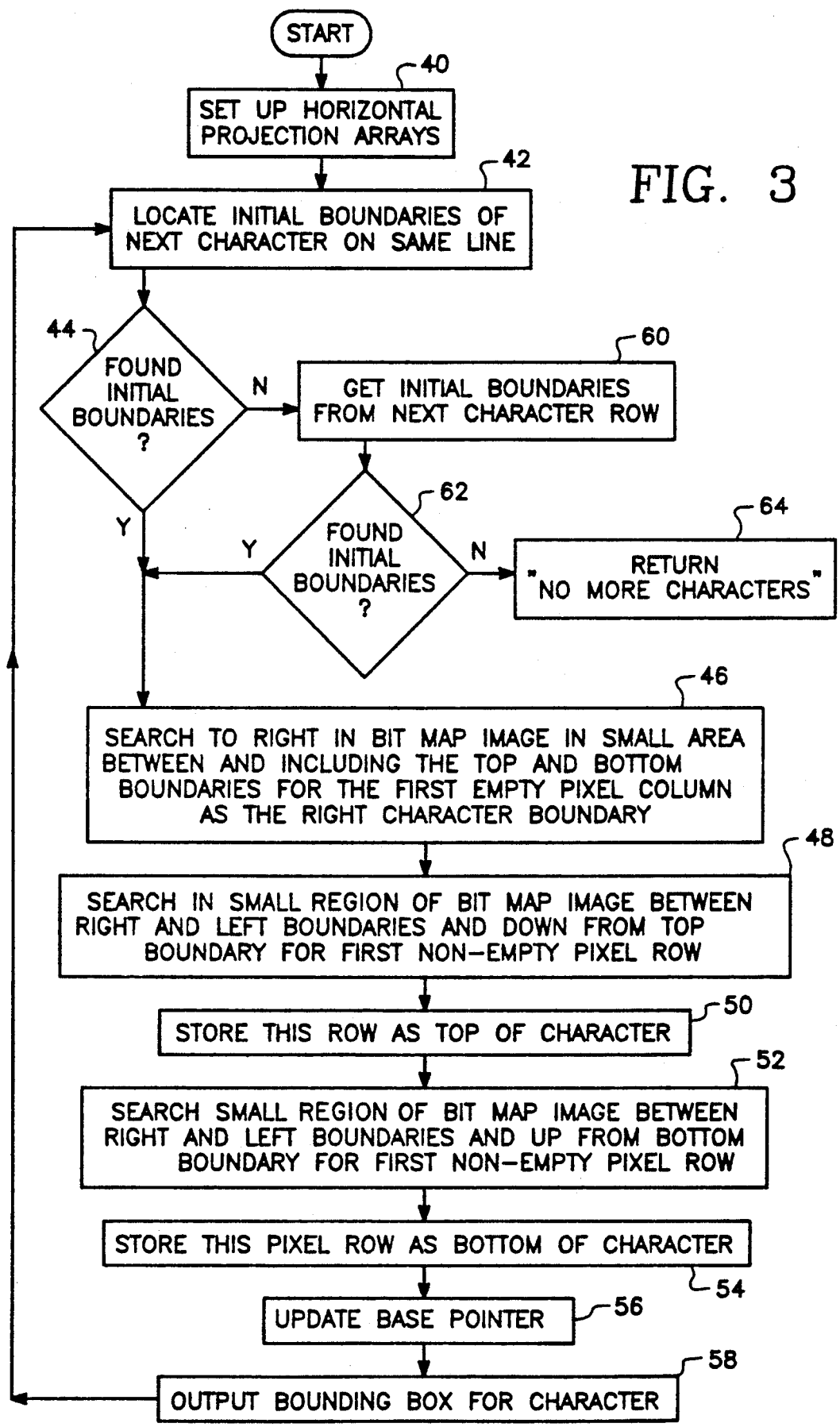
FIG. 3 is a block flow diagram illustrating the overall character segmentation process of the invention.
Figure 4B:
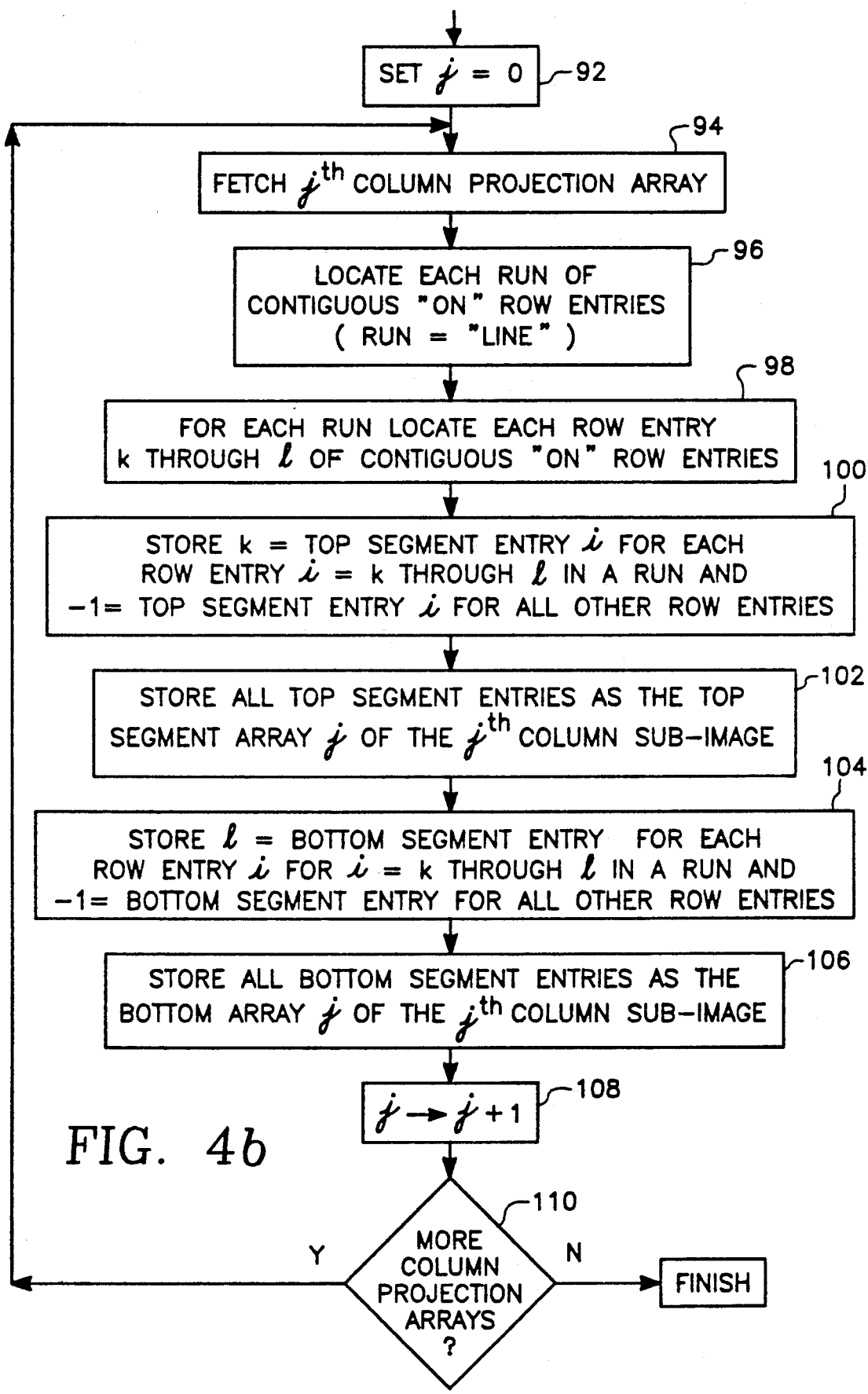

Referring to FIG. 3, the character segmentation process employs the top and bottom projection arrays 28 and 30 of FIG. 2 as a basis upon which to determine the top and bottom row boundaries within which to search for the right and left boundaries of successive characters in each character row. Therefore, the first step (block 40) in the process of FIG. 3 is to set up the top and bottom projection arrays 28, 30 for each vertical block 12-18. The steps comprising block 40 are illustrated in FIGS. 4a and 4b and will be discussed hereinbelow.

Figure 5:
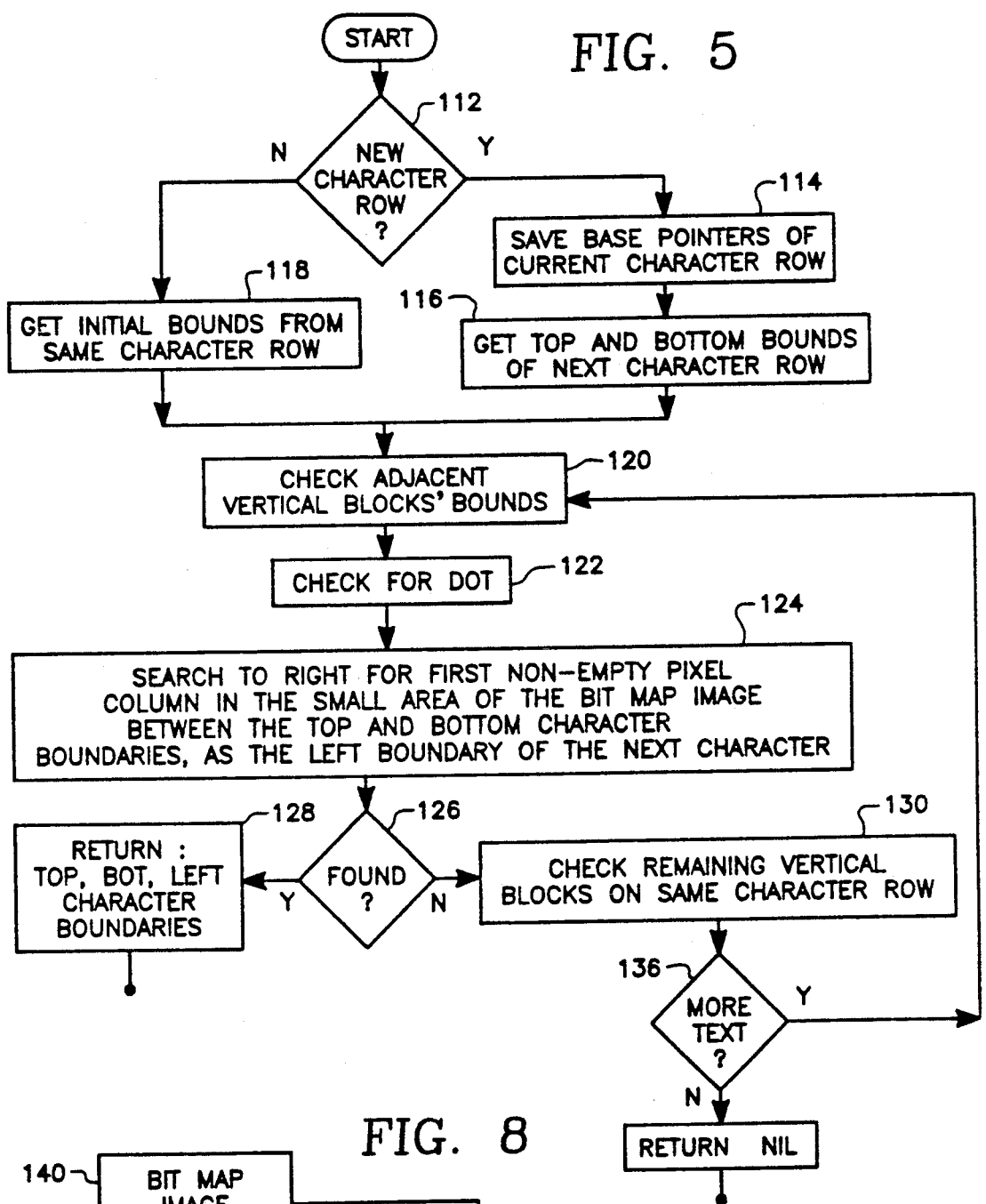
FIG. 5 illustrates the steps within the process of FIG. 3 of determining the top and bottom bounds of the current character row within a vertical block.

The next step of the process of FIG. 3 is to locate the initial (or "estimated") boundaries of the next character in the current character row (block 42 of FIG. 3). The initial boundaries of the next character correspond to the top and bottom of the character row in which the next character resides and the left boundary of the next character and provide an initial estimate of the character boundaries. The steps comprising block 42 are illustrated in FIG. 5 and will be discussed hereinbelow.

Continuing with the description of the process of FIG. 3, a determination is then made as to whether the top and bottom boundaries of the next character were successfully located (block 44 of FIG. 3). If so (Y branch of block 44), the next step is to precisely locate the exact right boundary of the next character (block 46 of FIG. 3). This step is performed by searching to the right in the document bit map image in the small area between the top and bottom initial boundaries of the character for the first empty pixel column. Once the right boundary of the next character has been located by the step of block 46, the exact top and bottom of the character are precisely located in the steps of blocks 48 and 52 of FIG. 3, respectively.

The top of the character is located in the step of block 48 by searching the small section of the bit map image between the right and left boundaries of the character (located in the steps of blocks 42 and 46 respectively) and down from the initial top character boundary—corresponding to the top row boundary—(located in the step of block 42) for the first pixel row having one or more "ON" pixels. The location of this pixel row is stored in memory as the exact top of the character (block 50). The bottom of the character is located in the step of block 52 by searching the same small section of the bit map image between the right and left boundaries of the character and up from the initial bottom character boundary—corresponding to the bottom row boundary—for the first pixel row having one or more "ON" pixels. The location of this pixel row is then stored in memory as the exact bottom of the character (block 54 of FIG. 3).

The next step is to prepare for searching for the next character to the right of the character located in the foregoing steps. For this purpose, a data base pointer defining the pixel column from which the search is to proceed to the right is updated based upon the right boundary of the last character located by the foregoing steps (block 56 of FIG. 3). The right, left, top and bottom character boundaries located in the previous steps are then output to a character recognition device of the type well-known in the art (block 58 of FIG. 3). This completes the segmentation process for one character. The process then repeats the step of block 42, using the base pointer updated in the step of block 56.

Returning to the step of block 44, if the initial boundaries of a next character cannot be found (N branch of block 44), this indicates that the end of the current character row has been reached or that the character row is empty, and so the process goes to the next character row in the same vertical block and attempts to find the initial boundaries of the first character therein (block 60 of FIG. 3). Again, a determination is made whether initial boundaries have been found (block 62 of FIG. 3). If so (Y branch of block 62), the process continues with the step of block 46. Otherwise (N branch of block 62), the process determines that it has reached the end of the document and there are no more characters (block 64 of FIG. 3).

The step of block 40 of FIG. 3 for setting up the top and bottom projection arrays 28 and 30 will now be described by reference to FIGS. 4a and 4b. FIG. 4a illustrates the sub-process for generating the column projection 26 of FIG. 2 for each one of the vertical blocks 12, 14, 16, 18. This sub-process starts with the first vertical bit map image block 12 of FIG. 1 (the step of block 70 of FIG. 4a). At this point, a vertical block index j has a value of zero, corresponding to the first vertical block 12. The index j specifies which one of the bit map image vertical blocks 12, 14, 16, 18 is the current vertical block being processed. An index i is initialized to zero (block 72 of FIG. 4a). The index i is the pixel row index (the number of the current pixel row). Next, in the step of block 74 of FIG. 4a, pixel row i is examined within the current or jth vertical block (i.e., vertical block j). Specifically, a determination is made whether this pixel row contains at least one "ON" pixel (block 76 of FIG. 4a). If so, the entry for row i is set to "ON" (block 78) and if not the entry is set to "OFF" (block 80), corresponding respectively to the cross-hatched and blank entries in the column projection 26 of FIG. 2. The index i is then incremented (block 82) and if there are more rows in the vertical block to be processed (Y branch of block 84), the process returns to block 74. Otherwise (N branch of block 84), the entries thus obtained for all values of the pixel row index i are stored in memory as the column projection 26 of FIG. 2 (block 86 of FIG. 4a). Next, the vertical block index j is incremented (block 88) and if there are more vertical blocks to be processed (Y branch of block 90) the process returns to the step of block 72 to begin processing the next bit map image vertical block. Otherwise (N branch of block 90), the process branches to the step of block 92 of FIG. 4b.

FIG. 4b illustrates the sub-process for generating the top and bottom projection or segment arrays 28, 30 of FIG. 2. This sub-process begins by initializing the vertical block index j to zero (block 92 of FIG. 4b). Then, the column projection 26 (FIG. 2) of the $j^{th}$ vertical block is fetched from memory (block 94). The sub-process locates each contiguous run of "ON" entries in the column projection 26 and associates the pixel rows spanned by the run with a line or character row (block 96). For example, as illustrated in FIG. 2, the character row 20 corresponds to a run of contiguous "ON" entries in the column projection array 26 beginning with pixel row 1 and ending with pixel row 4. Thus, for each run of contiguous "ON" entries in the column projection 26 (cross-hatched entries in FIG. 2), the process locates each pixel row k through a included in the run (block 98). The process stores the pixel row k as the top segment entry for each pixel row i=k through l and stores −1 for each pixel row i not within a ru of contiguous "ON" entries in the column projection array 26 (block 100 of FIG. 4b). In the step of block 102 of FIG. 4b, the foregoing top segment entries thus obtained are stored in order of pixel row number as the top projection array of the $j^{th}$ vertical block or column sub-image. This completes the steps for generating the top projection or segment array 28 of FIG. 2.

The steps for generating the bottom projection or segment array 30 of FIG. 2 are similar. The process stores the pixel row l as the bottom segment entry for each pixel row i=k through l within a run of "ON" entries and stores −1 for each pixel row i not within a run of contiguous "ON" entries in the column projection 26 (block 104 of FIG. 4b). In the step of block 106 of FIG. 4b, the foregoing bottom segment entries thus obtained are stored in order of pixel row number as the bottom projection array of the $j^{th}$ vertical block or column sub-image. This completes the steps for generating the bottom projection array 30 of FIG. 2.

The vertical block index j is then incremented (block 108). If there are more column projection arrays of vertical blocks to be processed (Y branch of block 110) then the process returns to the step of block 94 to begin processing the next vertical block. Otherwise (N branch of block 110) the sub-process for generating the top and bottom projection arrays is finished.

The step of block 42 of FIG. 3 for determining the initial boundaries of the next character to be processed is illustrated in FIG. 5. This same step is also performed in the step of block 60 of FIG. 3. Referring to FIG. 5, the first task is to determine whether the next character resides in the current character row being processed or lies in the next character row (block 112 of FIG. 5). If it lies in the next character row (Y branch of block 112), then the base pointer of the current character row is saved (block 114 of FIG. 5) and the initial top and bottom bounds or pixel rows of the next character row in the current vertical block are determined (block 116). The step of block 116 is performed simply by inspecting the top and bottom projection arrays 28, 30 of the current vertical block. In the example of FIG. 2, for instance, the first character row 20 has a top boundary at pixel row 1 (specified by the top projection array 28) and a bottom row boundary at pixel row 4 (specified by the bottom projection array 30). The next row (character row 22) corresponds to the next group of positive entries in the top and bottom projection arrays, which are "7" in the top projection array 28 and "9" in the bottom projection array 30. Therefore, the top and bottom boundaries of the next character row (the character row 22) would be determined by the step of block 116 to be the seventh and ninth pixel rows respectively.

If the next character resides in the current character row (N branch of block 112), then the initial top and bottom boundaries of the next character are the same as the current character's initial top and bottom boundaries (block 118 of FIG. 5).

In accordance with the preferred embodiment of the invention, these initial top and bottom boundaries are expanded in the step of block 120 to encompass the corresponding character rows in the adjacent vertical blocks to the left and right of the current vertical block. This step ensures that no character features are missed. How the step of block 120 is performed is best explained by reference to FIG. 1. If, for example, the current vertical block is the vertical block 14 and the current character row is the character row 22, then the initial bottom boundary is "lowered" to the bottom of the character row 22 in the vertical block 12 while the initial top boundary is "raised" to the top of the character row 22 in the vertical block 16.

To further guard against deleting character features in the segmentation process, the step of block 122 is performed in the preferred embodiment, in which the region immediately above the top of the current character row in the top projection array 28 of FIG. 2 is inspected for a small isolated run of "ON" pixels corresponding, for example, to the dot over a small letter "i". If such an isolated run of "ON" pixels is found using the top projection array 28, then the initial top boundary of the next character is raised to include it.

The next step is to find the left boundary of the next character (block 124). The step of block 124 is performed by searching to the right in the small area of the bit map image between the initial top and bottom boundaries for the first vertical pixel column having at least one "ON" pixel. If the left boundary is successfully located ("Y" branch of block 126), then the initial top and bottom boundaries of the next character as well as the left boundary of the character are stored (block 128). This completes the step of block 42 of FIG. 3 for locating the initial boundaries of the next character. Otherwise ("N" branch of block 126), the search for the left boundary of the next character is continued into the next vertical block to the left (block 130).

Figure 6:
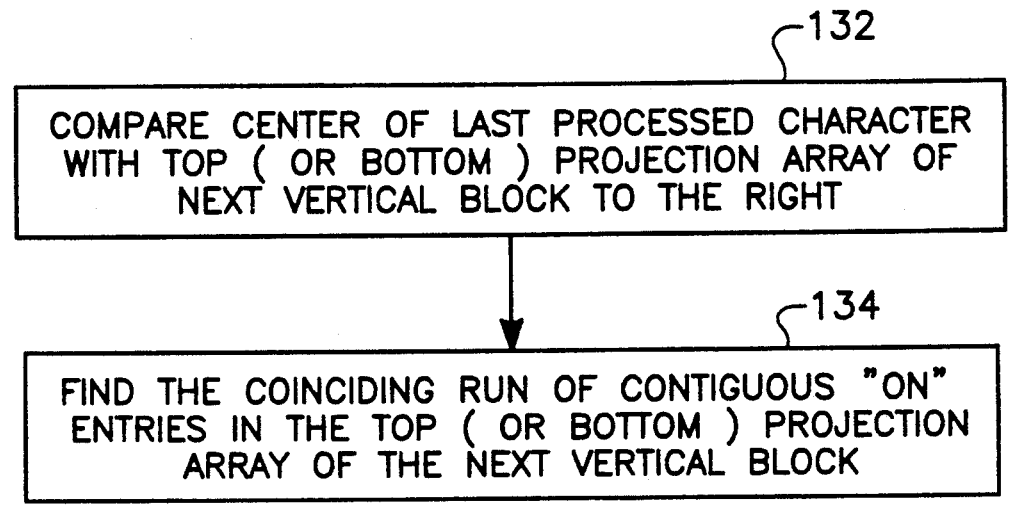
FIG. 6 is a block flow diagram illustrating the process of concatenating corresponding character rows of adjacent vertical blocks.

The step of block 130 continues the segmentation process described above into the next vertical block. In essence, this step concatenates the current character row in the current vertical block with the corresponding character row in the next vertical block to the right. It then begins the character segmentation process of FIG. 3 at the left end of the corresponding character row in the next vertical block. The sub-process performed in the step of block 130 for concatenating character rows in adjacent vertical blocks is illustrated in FIG. 6. As one example of this concatenation process, when the segmentation process of FIG. 3 reaches the right end of the character row 22 in the vertical block 14 in FIG. 1, it finds the continuation of the character row 22 in the next vertical block 16, or the left end of the character row 22 in the vertical block 16. It then performs the entire character segmentation process of FIG. 3 in the manner described above beginning at the left end of the character row 22 in the vertical block 16. How to find the left end of the character row 22 in the next vertical block 16 is illustrated in FIG. 6.

Referring to FIG. 6, the first step (block 132) in concatenating character rows of adjacent vertical blocks is to compare the center pixel row of the last character processed at the end of the current character row in the current vertical block (e.g., the vertical block 14) with the top (or bottom) projection array of the next vertical block (e.g., the vertical block 16). The next step (block 134) is to determine which one of the runs of contiguous "ON" entries in the top (or bottom) projection array of the next vertical block spans the center of the last character processed in the current character row of the current vertical block. The location of this one run points to the entries in the top and bottom projection arrays 28, 30 specifying the top and bottom pixel rows of the current character row in the next vertical block. If there is more text in the current row in the next vertical block (Y branch of block 136), the process returns to the step of block 120. The current character row is followed across all of the vertical blocks in this manner until no further characters are found (N branch of block 136).

Figure 7A:
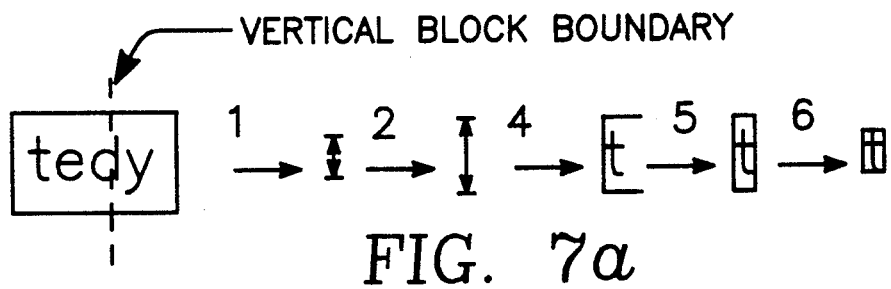
FIGS. 7a through 7c graphically illustrate the segmentation of various character images by the process of FIG. 3.

FIG. 7a illustrates how the invention segments the small letter "t" in a document whose image is divided into two vertical blocks separated at the imaginary vertical dashed line. In step (1) of FIG. 7a, the initial vertical bounds (the top and bottom pixel rows of the current character row comprising the letters "t", "e" and the left half of the letter "d") are established in accordance with the step of block 42 of FIG. 3. Then, in step (2) of FIG. 7a, these initial vertical boundaries are expanded to include the boundaries of the adjacent vertical block which include the letters "d" and "y", in accordance with the step of block 120 of FIG. 5. The next step (not shown in FIG. 7a) checks for isolated dots in accordance with the step of block 122 of FIG. 5. This latter step is not shown in FIG. 7a because there is no letter "i" in this example. In step (4) of FIG. 7a, the left vertical bound of the letter "t" is located in accordance with the step of block 124 of FIG. 5. Then, in step (5) of FIG. 7a, the right boundary of the letter "t" is located in accordance with the step of block 46 of FIG. 3. Finally, in step (6) of FIG. 7a, the exact top and bottom boundaries of the letter "t" are located in accordance with the steps of blocks 48 and 52 of FIG. 3.

Figure 7B:
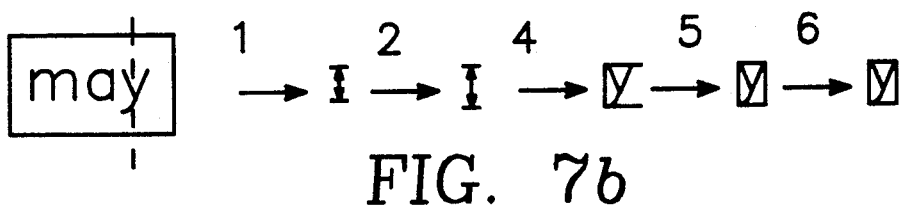

FIG. 7b illustrates the results achieved in the same steps performed to segment the letter "y" straddling the dashed line boundary between adjacent vertical blocks. The presence of the boundary has no affect upon the segmentation of the letter "y".

Figure 7C:
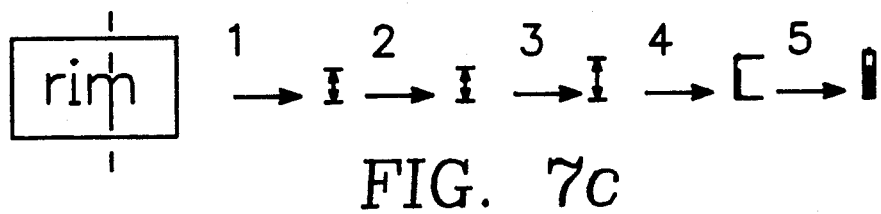

FIG. 7c illustrates the results obtained by the same steps in segmenting a small letter "i". In addition to steps (1), (2), (4), (5) and (6) discussed above with reference to the previous examples, the example of FIG. 7c further includes step (3) (performed after step (2)) in which the initial vertical boundary is raised to include the isolated dot of the small letter "i" in accordance with the step of block 122 of FIG. 5. The example of FIG. 7c illustrates the importance of step (3) in preserving the dot over the letter "i".

Figure 8:
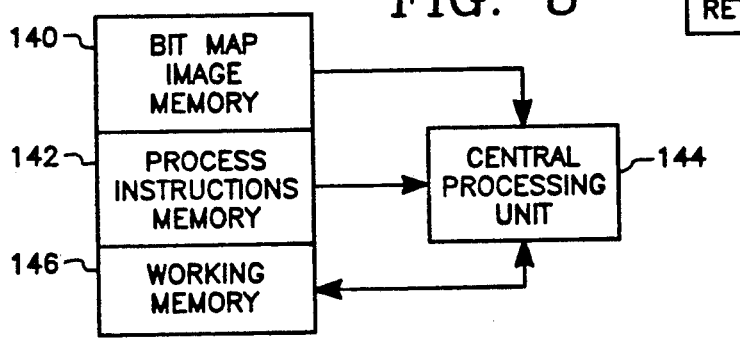
FIG. 8 is a simplified block diagram of apparatus employed in carrying out the process of FIG. 3.

Apparatus employed in carrying out the process described above with reference to FIGS. 2 through 7 is illustrated in the simplified block diagram of FIG. 8. A bit map image memory 140 stores the document's bit map image in binary form. A process instructions memory 142 stores a sequence of instructions for carrying out the processes of the flow diagram of FIG. 3, including the sub-processes of FIGS. 4a, 4b, 5 and 6. A central processing unit 144, such as a microprocessor of the type well-known in the art, sequentially executes the instructions stored in the instruction memory 142, thereby performing the process of FIGS. 3 through 6. The central processing unit 144 stores the various intermediate as well as the final results it generates in a working memory 146. One example of an intermediate result would be the top and bottom projection arrays 28 and 30 of FIG. 2. The final result is the exact top, bottom, left and right boundaries of an individual character.

Industrial Utility and Advantages

The invention is particularly useful for segmenting individual characters for high speed optical character recognition systems. The advantage of the invention is that very little data is fetched from the document bit map image in repetitive cycles. Specifically, steps (1) through (3) of FIGS. 7a through 7c, employ the projection arrays 28, 30. Moreover, while the remaining steps (4) through (6) do employ bit map image data, they fetch extremely small portions of the bit map image data comprising individual pixel columns lying between the top and bottom character row boundaries (steps (4) and (5)) and individual pixel rows lying between the character right and left boundaries (step (6)). As a result, the invention segments individual characters much faster than character segmentation processes of the prior art which required fetching and processing large portions of the document bit map image.

While the invention has been described in detail by specific reference to preferred embodiments thereof, it is understood that variations and modifications may be made without departing from the true spirit and scope of the invention.

What is claimed is:

1. A method for segmenting individual characters in a bit map of a document comprising successive rows of characters, said bit map comprising plural horizontal rows and vertical columns of "ON" and "OFF" pixels, in preparation for performing optical character recognition, said method comprising:
    dividing said bit map into plural vertical blocks;
    determining from horizontal projects of each of said vertical blocks the initial top and bottom bounds by:
        a) constructing for each of said vertical blocks a top horizontal projection array listing for each character row in the vertical block the top pixel row thereof;
        b) constructing for each of said vertical blocks a bottom horizontal projection array listing for each character row in the vertical block the bottom pixel row thereof; and
        c) deriving from said top and bottom projection arrays the top and bottom pixel row of each character row in said vertical block;
    determining from horizontal projections of reach of said vertical blocks initial top and bottom bound of one character in a successive one of said character rows in a current one of said vertical blocks;
    finding a left boundary of said on character by searching from left to right within a restricted portion of said bit map between the initial top and bottom bounds of said one character for a first pixel column having a t least a first threshold number of "ON" pixels and defining said left boundary to be said first pixel column having at least said threshold number of "ON" pixels;
    finding a fright boundary of said one character by searching from left to right from said left boundary of said character within said restricted portion of said bit map between the initial top and bottom bounds of said on character for a first pixel column having no more than a second threshold number of "ON" pixels and defining said right boundary to be said first pixel column having no more than said second threshold number of "ON" pixels;
    finding a top boundary of said one character by searching down from said initial top bound of said one character within a restricted portion of said bit map between said left and right boundaries of said one character for a first pixel row containing at least said first threshold number of "ON" pixels; and
    defining as said initial top bound of said one character the highest of the top pixel rows of the corresponding character rows in adjacent vertical blocks to the left and right of si current vertical block containing said character; and
    finding a bottom boundary of said one character by searching up from said initial bottom bound of said one character within said restricted portion of said bit map between said left and right boundaries of said one character for a first pixel row containing at least said first threshold number of "ON" pixies.

2. The method of claim 1 further comprising:
    defining as the initial bottom bound of said one character the lowest of the bottom pixel rows of the corresponding character rows in adjacent vertical blocks to the left and right of said current vertical block containing said character.

3. The method of claim 1 further comprising:
    searching said top projection array for an isolated run of "ON" pixels near and above said top bound of said one character and re-defining said initial top bound as the top pixel row of said isolated run of "ON" pixels.

4. The method of claim 1 further comprising:
repeating the foregoing steps for the next character to the right in said one character row;
when the last character in said one character row has been segmented, finding the corresponding one character row in an adjacent vertical block to the right of said current vertical block and repeating said determining step and each of said finding steps beginning at a left end of said corresponding one character row in said adjacent vertical block.

5. The method of claim 1 wherein the step of finding the corresponding one character row in an adjacent vertical block to the right comprises finding a horizontal projection of a character row in said adjacent vertical block which spans a center portion of the last character segmented in said one character row of said current vertical block.

6. The method of claim 1 wherein said first threshold number is one and said second threshold number is zero.

7. Apparatus for segmenting individual characters in a bit map of a document comprising successive rows of characters, said bit map comprising plural horizontal rows and vertical columns of "ON" and "OFF" pixels and being stored in a bit map memory, said apparatus comprising:
means for dividing said bit map into plural vertical blocks;
means for determining from horizontal projections of each of said vertical blocks initial top and bottom bounds of one character in a successive one of said character rows in a current one of said vertical blocks by;
a) means for constructing for each of said vertical blocks a top horizontal projection array listing for each character row in the vertical block the top pixel row thereof
b) means for constructing for each of said vertical blocks a broom horizontal projection array listing for each character row in the vertical bloc the bottom pixel row thereof; and
c) means for deriving from said top and bottom projection arrays the top and bottom pixel row of each character row in said vertical block.
means for finding a left boundary of said one character by searching from left to right within a restricted portion of said bit map between the initial top and bottom bounds of said one character for a first pixel column having at lest a first threshold number of "ON" pixels and defining said left boundary to be said first pixel column having at least said threshold number of "ON" pixels;
means for finding a right boundary of said one character by searching from left to right from said left boundary of said character within said restricted portion of said bit map image between the initial top and bottom bounds of said one character for a first pixel column having no more tan a second threshold number of "ON" pixels and defining said right boundary to be said first pixel column having no more than said second threshold number of "ON" pixels;
means for finding a top boundary of said one character by searching down from said initial top bound of said one character within a restricted portion of said bit map image between said left and right boundaries of said on character for a first pixel row containing at lest said first threshold number of "OPN" pixels; and
means for defining as said initial top bound of said one character the highest of the top pixel rows of the corresponding character rows in adjacent vertical block to the left and right of said current vertical block containing said character; and
means for finding a bottom boundary of said one character by searching up from said restricted portion of said bit map image between said left and right boundaries of said one character for a first pixel row containing at least said first threshold number of "ON" pixels.

8. The apparatus of claim 7 further comprising:
means for defining as the initial bottom bound of said one character the lowest of the bottom pixel rows of the corresponding character rows in adjacent vertical blocks to the left and right of is current vertical block containing said character.

9. The apparatus of claim 7 further comprising
means for searching said top projection array for an isolated run of "ON" pixels near and above said top pixel row of said one character row and re-defining said initial top bound as the top pixel row of said isolated run of "ON" pixels.

10. The apparatus of claim 7 further comprising:
concatenation means responsive upon the last character in said one character row being segmented, for finding the corresponding one character row in an adjacent vertical block to the right of said current vertical.

11. The apparatus of claim 10 wherein said concatenation means for finding the corresponding one character row in an adjacent vertical block to the right comprises means for finding a horizontal projection of a character row in said adjacent vertical block which spans a center portion of the last character segmented in said one character row of said current vertical block.

12. The apparatus of claim 7 wherein said first threshold number is one and said second threshold number is zero.

* * * * *